(12) United States Patent
Antoch et al.

(10) Patent No.: US 7,567,257 B2
(45) Date of Patent: Jul. 28, 2009

(54) PARTITION-BASED UNDO OF PARTITIONED OBJECT GRAPH

(75) Inventors: Steven T. Antoch, Northbend, WA (US);
Jack J. Greenfield, Redmond, WA (US);
Keith S. Hamilton, Redmond, WA (US);
George Mathew, Kirkland, WA (US);
Niall L. McDonnell, Seattle, WA (US);
Ramesh Rajagopal, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 11/305,454

(22) Filed: Dec. 16, 2005

(65) Prior Publication Data

US 2007/0143335 A1 Jun. 21, 2007

(51) Int. Cl.
*G09G 5/00* (2006.01)
(52) U.S. Cl. ........................ 345/619; 715/751
(58) Field of Classification Search ................. 345/619; 715/853, 751
See application file for complete search history.

(56) References Cited

U.S. PATENT DOCUMENTS

| | | | | |
|---|---|---|---|---|
| 5,490,246 A * | 2/1996 | Brotsky et al. | ........... | 715/853 |
| 5,805,884 A | 9/1998 | Sitbon et al. | ........... | 395/680 |
| 5,884,309 A | 3/1999 | Vanechanos, Jr. | ........... | 707/10 |
| 5,999,182 A * | 12/1999 | Etchemendy et al. | ........... | 715/853 |
| 6,311,320 B1 | 10/2001 | Jibbe | ........... | 717/1 |
| 6,425,016 B1 * | 7/2002 | Banavar et al. | ........... | 715/751 |
| 6,668,368 B1 | 12/2003 | Hernandez, III | ........... | 717/115 |
| 6,681,386 B1 | 1/2004 | Amin et al. | ........... | 717/136 |
| 6,961,910 B2 * | 11/2005 | Lee et al. | ........... | 715/853 |
| 2003/0105958 A1 | 6/2003 | McArdle | ........... | 713/167 |
| 2004/0088368 A1 | 5/2004 | Burrell | ........... | 709/217 |
| 2004/0177349 A1 | 9/2004 | Black-Ziegelbein et al. | . | 717/139 |
| 2005/0004973 A1 | 1/2005 | Snover et al. | ........... | 709/200 |
| 2005/0091201 A1 | 4/2005 | Snover et al. | ........... | 707/3 |

FOREIGN PATENT DOCUMENTS

EP 0701202 3/1996

OTHER PUBLICATIONS

Data Generation Techniques for Automated Software Robustness Testing Matthew Schmid & Frank Hill.
Wafe—An X Toolkit Based Frontend for Application Programs in Various Programming Languages Gustaf Neumann, Stafan Nusser 1992 Winter USENIX—Jan. 25-29, 1993—San Diego, CA.
SLURM: Simple Linux Utility for Resource Management M. Jette, M. Grondona Jun. 23, 2003.

* cited by examiner

*Primary Examiner*—Chante Harrison
(74) *Attorney, Agent, or Firm*—Workman Nydegger

(57) ABSTRACT

The performing of actions on an object graph that contains multiple objects. The objects are categorized into partitions. Taking into account the partitions, a particular non-final action performed on the object graph may be undone without necessarily first undoing all of the one or more subsequent actions. Instead, if the subsequent actions involved objects of different partitions than the objects that were affected by the particular action desired to be undone, the particular action may be undone without undoing the subsequent actions.

18 Claims, 5 Drawing Sheets

| Action | A1 | A2 | A3 | A4 | A5 |
|---|---|---|---|---|---|
| Affected Partition | ABC | A | AB | A | C |

PARTITION-BASED UNDO OF PARTITIONED OBJECT GRAPH

BACKGROUND

Background and Relevant Art

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing system may be small enough to fit in the palm of the hand, while others are spread over much of the globe.

Regardless of their physical form, computing systems are composed of hardware and software. The hardware includes most fundamentally at least one processor and memory. The software includes instructions that may be embodied in the memory or in storage, and that can be accessed and executed by the processor(s) to direct the overall functionality of the computing system. Thus, software is critical in enabling and directing the functionality of the computing system.

One technology that has greatly facilitated such complex software is object-oriented programming, which is supported by many popular programming languages. In object-oriented programming, a class is defined. The class definition includes one or more data field definitions that defines one or more data fields, and zero or more methods that define functions associated with the class. During run time, instances of the class in the form of "objects" are created in memory. The object instances are data structures that conform to the associated class definition in that they have the one or more data fields and zero or more methods associated with the object as defined by the associated class.

In a complex program, a large variety of objects may be highly interdependent. For instance, one object may be a component of another object by being included or referred to in the data field of a parent object. Additionally, one object (i.e., a "calling object") may call upon functionality offered by another object (i.e., a "callee object") to accomplish the larger functionality of the calling object. The objects may be intertwined in a complex web of interdependencies, where a single object may be called by many other objects, and where that same object may call upon the services of yet other objects. Furthermore, the objects may even call upon their own services when recursive programming techniques are employed.

The various objects and interdependencies associated with those objects are sometimes collectively referred to as a "model" and will also be referred to herein as either a "model" or an "object model". Often, these object modules are represented using an object graph, which is a set of objects with references between them. In order to program such complex object graphs, it is helpful to have different views of the corresponding object graph so as to appeal to the various intuitive abilities of the programmer, and to allow for the task of programming to be tackled from different angles. For instance, one programming editor may present a graphical view of an object graph in which each object and interdependency is represented by a graphical element. An example of a graphical view of an object graph is a hierarchical tree with nodes representing objects, and with interdependencies represented by hierarchical branches in the tree. Another editor may view the actual source code of the object graph. Different editors may be opened against the same object graph at the same time. For editors to work efficiently with the object graph, the object graphs are usually stored in data structures that provide an infrastructure for transactions to be performed against the object graph. For instance, the data structure may include an undo method and a change notification method.

In any case, as a programmer is editing an object graph, the programmer may occasionally desire to undo an action against the programming model. In conventional object graphs that allow multiple editors to be opened against a single object graph, the undo method is applied globally regardless of which editor in which the programmer initiates the undo. For instance, suppose a programmer were to perform actions A and B in editor 1, and action C in editor 2, and then return to editor 1. If the programmer were then to select an undo function in editor 1, action C would be undone since action C was the last action performed, even though the programmer may intend that the last action performed in editor 1 (namely, action B) be undone. However, since action C may depend on the state resulting from action B, action C is undone first. Nevertheless, the global application of undo actions across all editors against an object graph may contravene the intent of the programmer.

BRIEF SUMMARY

The principles of the present invention relate to the performing of actions on an object graph that contains multiple objects. The objects are categorized into partitions. Taking into account the partitions, a particular non-final action performed on the object graph may be undone without necessarily first undoing all of the one or more subsequent actions. Instead, if the subsequent actions involved objects of different partitions than the objects that were affected by the particular action desired to be undone, the particular action may be undone without undoing the subsequent actions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention extend to the performing of actions on an object graph that contains multiple objects. The objects are categorized into logical containers called "partitions" into which logically related objects are placed. Of course, the partitions need not be physical containers. The objects logically contained within the partition may simply have an associated partition identifier (either expressed or implied) that defines the partition in which the object is logically contained.

The partitions define undo boundaries such that objects within a partition are assumed as related in the undo sense. Specifically, when performing an undo operation, any later action to any object in that partition must first be undone before any prior action to any object in that partition. In other words, subsequent actions involving a partition must first be undone before prior actions involving that partition. This dependence in undo order may also be referred to herein as "undo dependence". In contrast, later actions on objects need not be undone if they do not involve the same partition as a prior action that is being undone. Thus, in cases in which there are no undo dependencies between a particular non-final action and a particular subsequent action, the subsequent action need not be undone prior to undoing the non-final action. The partition boundaries may be created such that elements that are related in the undo sense are in the same partition. As a non-limiting example, perhaps objects that are edited by the same editor are in the same partition. In this description and in the claims, an "editor" is a component that operates upon an object graph. Editors may include a user interface that allows a user to direct the editing of the object graph. Alternatively, the editor may edit in a programmatic fashion without the use of a user interface.

In many cases, it is not intuitive for a user to want to undo a non-final action on any object graph without undoing the subsequent actions on that object graph. In other cases, it is intuitive. For instance, suppose that there are multiple editors operating concurrently upon the same object graph. One editor (called in this paragraph a "first" editor) may have performed the first three actions, and then the other editor (called in this paragraph a "second" editor may have performed the last two actions in a sequence of five action. Now, suppose the user of the first editor initiates an undo operation. The user of the first editor may expect that the third action be undone, but does not necessarily expect that the actions done in the second editor will be undone. If the actions performed in the second editor do not have undo dependence with the actions performed by the first editor, then the user of the first editor may perform the undo operation without affecting the actions performed in the second editor.

Figure 1:
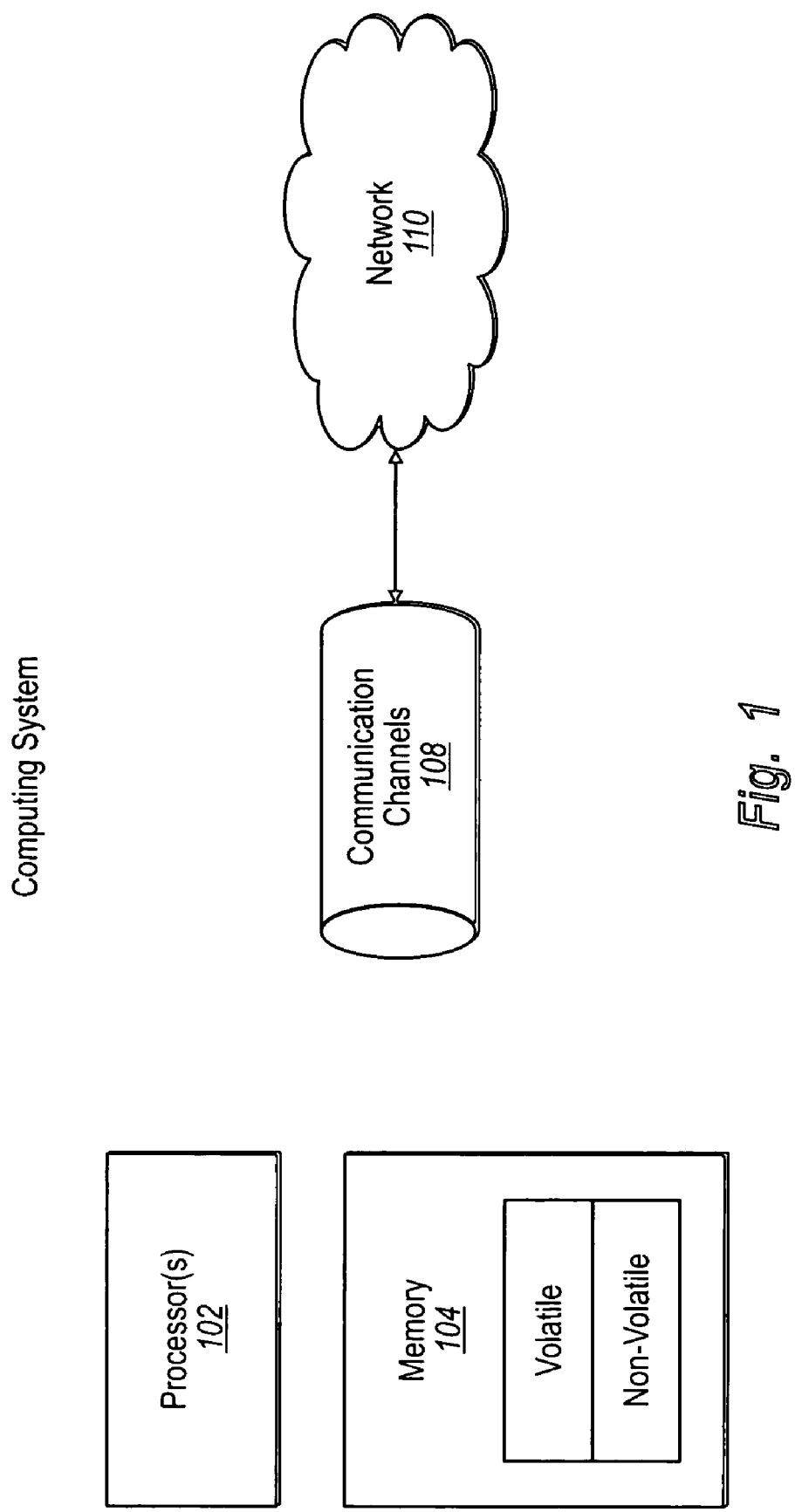
FIG. 1 schematically illustrates a suitable computing environment that may implement features of the present invention.

A computing system that may be used to implement features of the present invention will first be described with respect to FIG. 1. Then, embodiments of the present invention will be described in further detail with respect to FIG. 2 and subsequent figures. The embodiments of the present invention may comprise a special purpose or general-purpose computer including various computer hardware, as discussed in greater detail below. FIG. 1 shows a schematic diagram of an example computing system 100 that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but is not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 2:
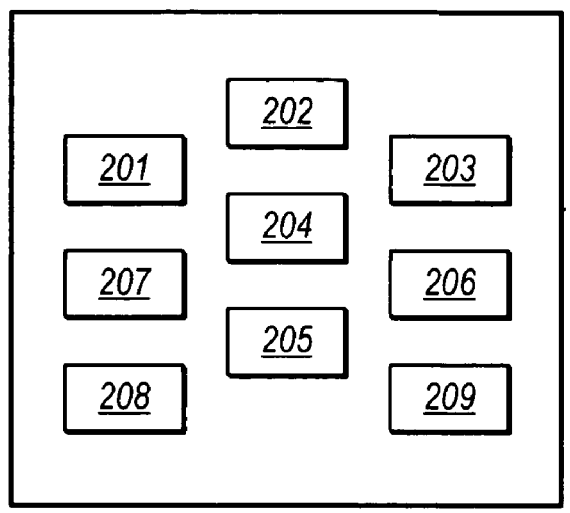
FIG. 2 schematically illustrates a store that contains an object graph in accordance with the prior art.

Prior to discussing the details of embodiments of the present invention, the concept of an "object graph" will be illustrated and discussed. FIG. 2 illustrates a store 200 that contains an object graph in accordance with the prior art. The store 200 may be volatile and/or non-volatile memory and/or storage. The store 200 may contain some number of objects that are instantiated in the store 200. In this example, the store 200 contains nine objects labeled objects 201 through 209. Although not shown, the objects may be related to one another. For instance, one object may contain a data structure defined by the class definition of another object. Furthermore, one object may place a function call to another object.

Some of the objects may be closely related to each other in that actions performed on one object have a tendency to affect the other closely related object with higher frequency. Others of the objects may be less closely related in that actions performed on one object are less likely to affect the other object. Some objects have no relation whatsoever in that actions performed on one object never affect the other object. Regardless, each of the objects 201 through 209 is placed in store 200.

Now suppose that a sequence of actions is performed on the objects in the store 200. Also, assume that the store 200 has associated logic which allows the store to remember the action sequence, and formulate logic for undoing the action sequence. If the store 200 receives undo instructions, the store 200 must undo the actions in reverse order. If the first action or a middle action is to be undone, all of the subsequent actions must first be undone in reverse order. However, in some cases, it may be desirable to undo a non-final action in the action sequence without undoing all or some of its subsequent actions. For instance, perhaps there are multiple editors operating against the object graph. In that case, the store 200 will still undo the actions globally in reverse order since the store 200 is not capable of evaluating undo dependencies, and therefore assumes that all subsequent actions have undo dependence with all prior actions.

Figure 3:
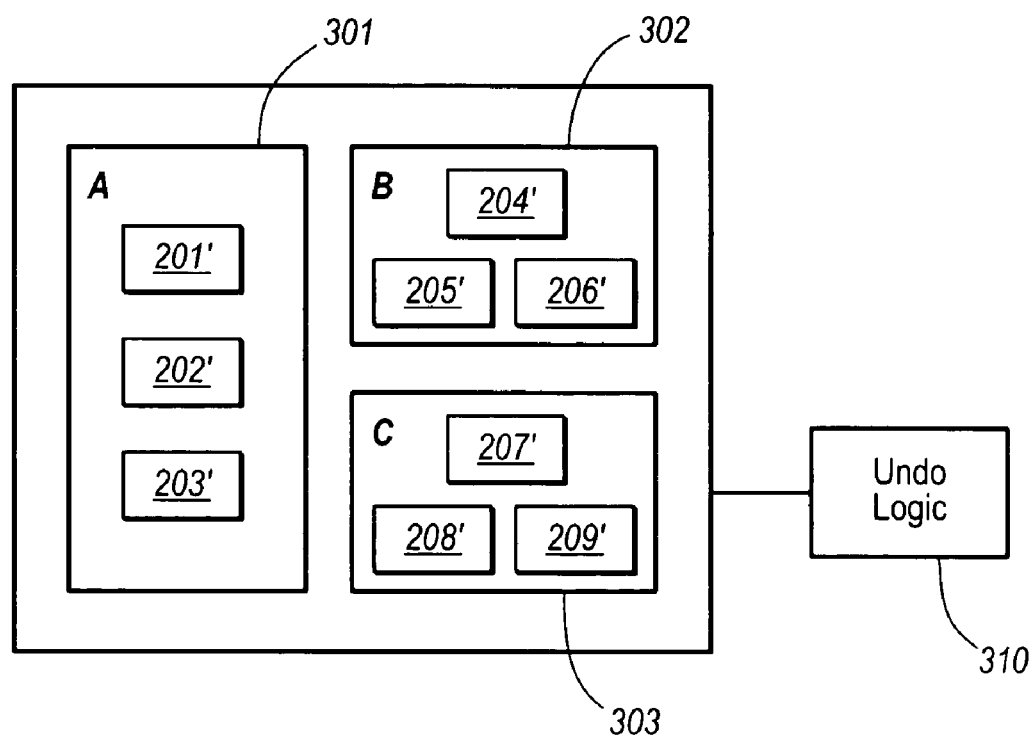
FIG. 3 schematically illustrates a store that contains a partitioned object graph in accordance with the principles of the present invention.

FIG. 3 illustrates a store 300 in accordance with the principles of the present invention. The store 300 includes a data structure that represents an object graph in the form of objects 201' through 209' that are logically contained within three partitions 301 through 303 (also referred to as partitions A through C, respectively). The objects 201'-209' may be the same objects as objects 201 through 209, but may also be slightly modified to potentially include some identification of their associated partition. The store 300 may be created using a combination of the processor(s) 102 and memory 104 when implemented using the computing system 100 described above with respect to FIG. 1.

In the specific illustrated case of FIG. 3, the store 300 includes objects 201', 202' and 203' included in partition 301; objects 204', 205' and 206' included in partition 302; and objects 207', 208' and 209' included in partition 303. Once again, the partitions 301-303 may only be logical containers in which case there may be some indication to the undo logic 310 of the associations between the objects and the partitions.

Actions performed on objects outside of a given partition, but that do not affect objects within the given partition, lack undo dependence with actions that are performed within the given partition. Thus, the store 300 includes associated undo logic 310 that permits undoing of a prior action without necessarily undoing a subsequent action that lacks undo dependence with the prior action. The ability to undo an intermediate action without undoing some or all of the subsequent actions will also be referred to herein as "intermediate undo" ability.

For instance, a prior action that affects one or more of only objects 201' through 203' may be undone without first undoing an action that affects one or more of only objects 204' through 209'. Similarly, a prior action that affects one or more of only objects 201' through 206' may be undone without first undoing an action that affects one or more of only objects 207' through 209'. Finally, a prior action that affects one or more of objects 201' through 203' and 207' through 209' may be undone without first undoing an action that affects one or more of only objects 204' through 206'.

Furthermore, a prior action that affects one or more of only objects 204' through 206' may be undone without first undoing an action that affects one or more of only objects 201' through 203' and 207' through 209'. Similarly, a prior action that affects one or more of only objects 204' through 209' may be undone without first undoing an action that affects one or more of only objects 201' through 203'. Finally, a prior action that affects one or more of only objects 207' through 209' may be undone without first undoing an action that affects one or more of only objects 201' through 206'.

Figures 4, 5:
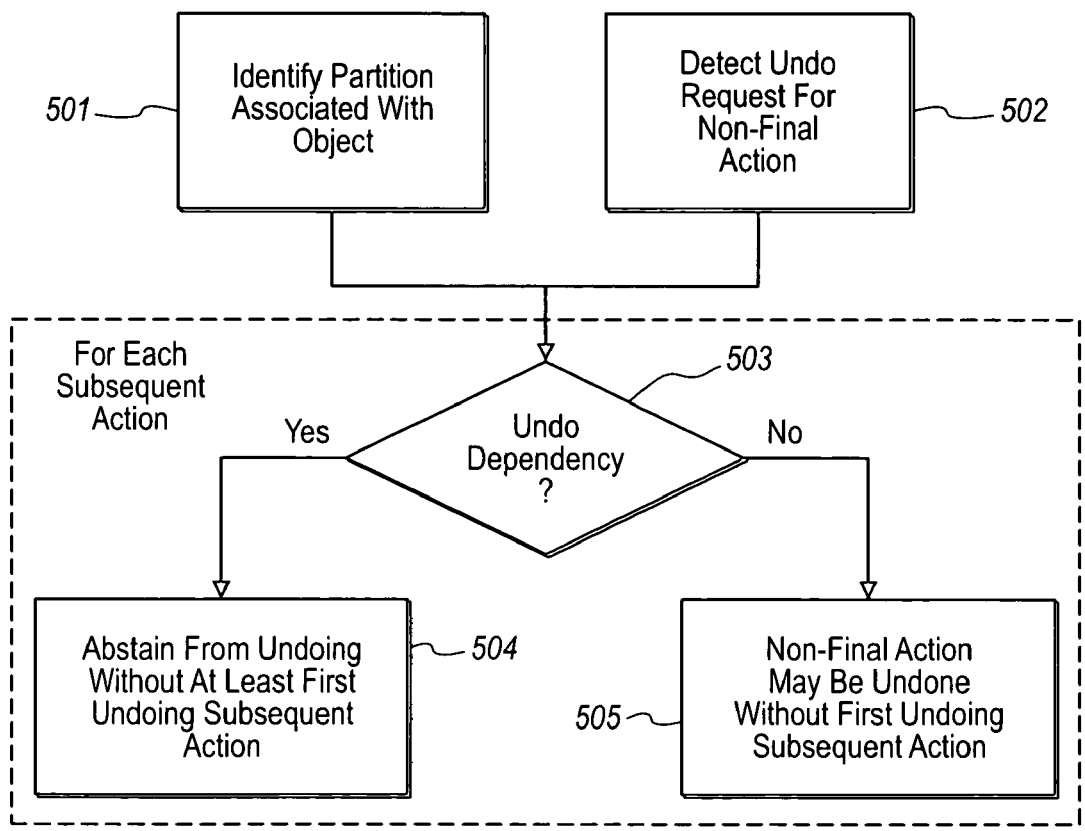
FIG. 4 schematically illustrates an example sequence of actions that may be performed on the object graph of FIG. 3 along with the associated partitions that are affected by each of the actions.
FIG. 5 illustrates a flowchart of a method for undoing an action on an object graph in accordance with the principles of the present invention.

The undo logic 310 enforces undo dependency and permits intermediate undo when appropriate. FIG. 4 illustrates an example action sequence 400 involving five actions A1 through A5. Of course, the principles of the present invention apply to any sequence of actions involving any number of actions. Furthermore, the principles of the present invention may apply to a store having any number of partitions, not just three as in the example. The undo logic 310 keeps track of the specific sequence of actions, and knows how to undo each action for when it determines that undoing an action is appropriate. Furthermore, the undo logic 310 keeps track of which partitions an associated action affects.

For instance, in the action sequence 400, action A1 was first performed which affects one or more objects in each of partitions A, B and C. Next, action A2 was performed, which affected one or more objects in only partition A. Third, action A3 was performed, which affected one or more objects in each of partitions A and B. Fourth, action A4 was performed, which affected one or more objects in only partition A. Finally, action A5 was performed, which affected one or more objects in only partition C. Thus, any given action may involve just a single partition, or may span multiple partitions.

FIG. 5 illustrates a flowchart of a method 500 for undoing an action on an object graph in accordance with the principles of the present invention. The method 500 will be described with frequent reference to the example store 300 and object graph of FIG. 3, and with respect to the example action sequence 400 of FIG. 4. However, the principles of the present invention may be applied to any other object graph having any number of partitions, and to any action sequence. The undo logic 310 may use the method 500 to undo actions.

When using the method 500, the undo logic 310 identifies an object graph partition associated with at least some of the objects in the object graph (act 501). In the illustrated case of FIG. 3, the undo logic 310 has identified a partition associated with all of the objects of the object graph. However, if there were an object not included in any partition, then any subsequent action on that object would be presumed to have undo dependency with any prior action.

The identification of the partition associated with the object may be expressed or implied. In the expressed cases, the object may have a corresponding partition identifier within or referred to by the corresponding object. Alternatively, the undo logic 310 may separately keep track of an association between the object and partition without having the object include such a reference. In that case, the partition identified by the partition identifier would be identified as associated with the object. In the implied case, there may be no partition identifier included within or referred to by the object, and there may be no other expressed association of a partition with the object. In that case, a default partition may be associated with the object. The default partition may be decided based on characteristics of the object or based on other state or measurable parameters. Alternatively, there may be a single default partition that all objects are assigned to if there is no expressed indication of the associated partition.

The association of the object with a partition may be made at any time, even in advance of any undo request, or even in advance of the action sequence occurring on the object graph. At some point, an undo request for an intermediate action is received (act 502) despite there being one or more subsequent requests that are performed on the object graph that are not requested to be undone. For instance, suppose that actions A1, A2 and A3 were first performed by a first editor, and actions A4 and A5 were subsequently performed by a second editor. Now suppose that a user selects an undo function in the first editor. This may be interpreted by the undo logic 310 as being an undo request for action A3.

Once the correlation between the partitions and objects is made (act 501), and the undo request for the non-final action is received (act 502), the undo logic determines for each subsequent action (performed after the non-final action) whether or not the subsequent action is performed on at least one object that has a partition within the same set of partitions that is affected by the non-final action. In other words, the undo logic decides whether or not there is undo dependency between the subsequent action and the non-final action requested to be undone (decision block 503).

If there is an undo dependency (Yes in decision block 503), then the undo logic 310 follows an execution path (if implemented in software) in which the undo logic 310 abstains from undoing the particular action at least not without first undoing the corresponding subsequent action under evaluation (act 504). If there is no undo dependency (No in decision block 503), then the undo logic 310 follows another execution path in which the undo logic 310 may undo the non-final action even without undoing the corresponding subsequent action under evaluation (act 505).

For instance, referring to FIG. 4, suppose that action A4 was the non-final action being requested to be undone. Action A5 is the only subsequent action in the action sequence 400. However, action A5 involves a different partition (partition C) than the partition affected by action A4 (partition A). Accordingly, action A4 may be undone without undoing action A5.

Suppose, however, that the action A3 was the action being requested to be undone. Such might be the case, for example, if actions A1, A2 and A3 were performed by a first editor, and actions A4 and A5 by a second editor, with the undo function being initiated in the user interface of the first editor. In that case, action A5 still involves a different partition (partition C) than action A3 (partitions A and B). Thus, action A3 could be undone without undoing action A5. However, action A4 involves one of the same partitions (partition A) as action A3 (partitions A and B). Thus, although action A5 need not be undone, action A4 would be undone before action A3 could be undone.

Continuing the example, if action A2 were the action requested to be undone, then actions A4 and A3 would be undone first, although action A5 need not be undone. In some cases, however, there may be other reasons for undoing a subsequent action first before undoing a prior action that are unrelated to the partition-based undo-dependency described herein. For instance, if action A2 were requested to be undone in the first editor that performed actions A1, A2 and A3, action A3 may be first undone even if it did not involve the same partitions as action A2. Recall that the undoing of the prior action before a subsequent action may not be intuitive or desirable in all cases. If the actions A2 and A3 are both performed in the same editor, the user intuition upon selecting to undo an action would often no longer be expecting an undo of action A2 without first undoing action A3.

Completing the example, if the action requested to be undone were action A1, then all of the subsequent actions A5 through A2 (in reverse order) would first be undone, since the action A1 involved all of the partitions A, B and C.

Figure 6:
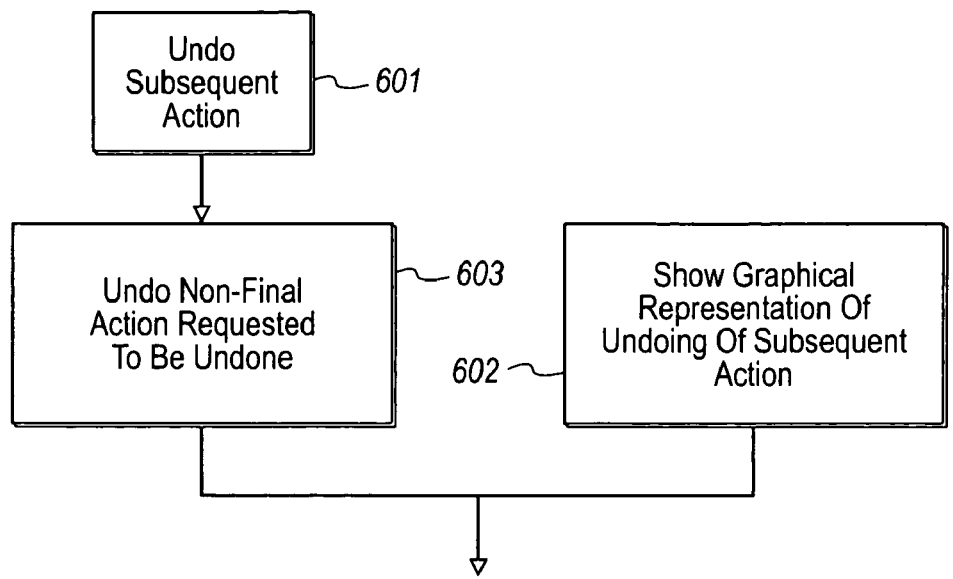
FIG. 6 illustrates flowchart of a method for abstaining from undoing the non-final action at least not without first undoing the subsequent action.

FIG. 6 illustrates flowchart of a method 600 for performing one specific embodiment the act of abstaining from undoing the non-final action at least not without first undoing the subsequent action (act 504) of FIG. 5. In one embodiment, this act is accomplished by undoing the subsequent action (act 601) and graphically showing a representation that the undo of the subsequent action has occurred (or is occurring, or will occur) in the user interface of the object graph editor that initiated the undo request and/or the user interface of the object graph editors that did not initiate the undo request (act 602).

After the subsequent action is undone (act 601), but at any time with respect to the presentation of the graphical representation of such (act 602), the non-final action requested to be undone may be undone (act 603) assuming that there were no other subsequent actions that also needed to be undone. If there were other subsequent actions to be undone, those subsequent actions may also be undone, with an appropriate graphical representation of the same being displayed to the user. In one embodiment, the user requesting the undo would be requested to confirm whether or not the user wishes to proceed with the undo operation after informing the user of the need to first undo the subsequent action.

Figure 7:
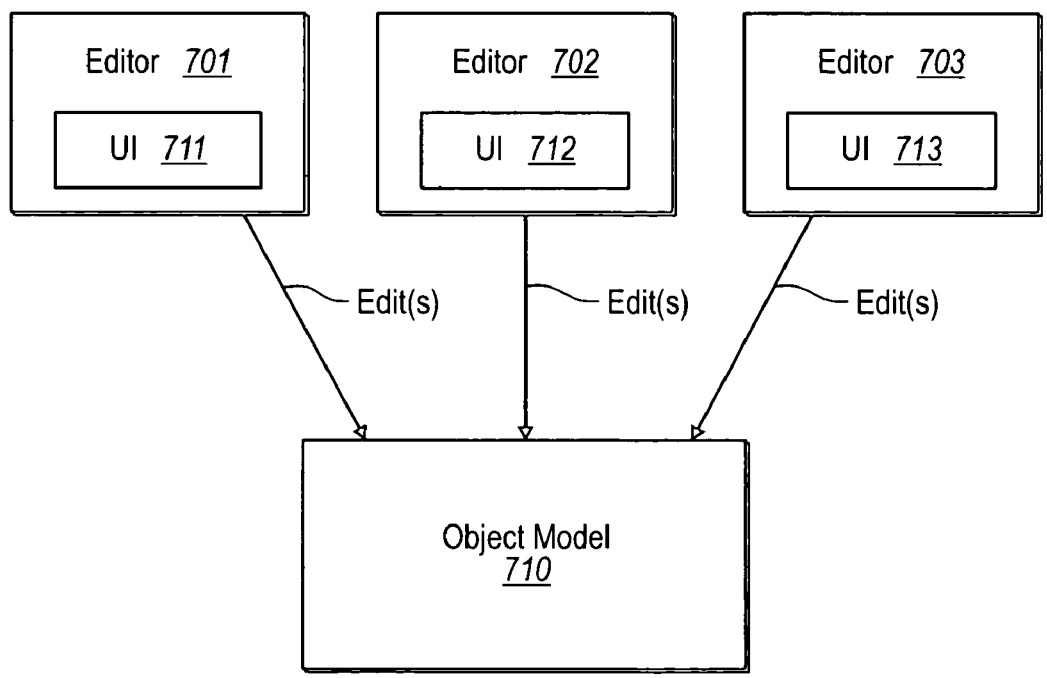
FIG. 7 schematically illustrates an environment in which three editors are concurrently editing a single object graph.

For example, FIG. 7 schematically illustrates an environment 700 in which three editors 701, 702 and 703 are concurrently editing a single object graph 710. The environment 700 may be distributed even perhaps throughout the globe or even beyond as networks expand. Furthermore, there may be any number (even hundreds, thousands, millions or more) of editors operating upon the object graph as scalability permits. In this context, the principles of the present invention provide the ability to perform an intermediate undo of an action on an object graph that is concurrently being potentially modified in independent ways by numerous other editors. This permits a level of cooperative object graph creation not permitted by object graph editing technology. Thus, significantly more complex object graphs and software could be collaboratively generated using the enhanced collaboration capability offered by embodiments of the present invention.

Although each of the editors 701-703 are illustrated as including an associated user interface 711-713, the principles of the present invention do not require that the editor have a user interface. Instead, the editing may occur programmatically without interfacing with a user. If the editor 701 requests an undo on a non-final action in a particular action sequence against the object graph, then the user interface 711 of the editor 701 may display a graphical representation whenever such an undo request causes a subsequent action to also be undone if the editor 701 has a user interface 711. Likewise, there may a graphical representation displayed in the user interfaces 712 and 713 of the associated editors 702 and 703 indicating that the undo of the subsequent actions is being made in the editors 702 and 703 have associated user interfaces 712 and 713. Alternatively, only the user interface 711 of the editor that requested the undo, along with only the user interface of the editor that initiated the particular subsequent action being undone are displayed a graphical representation of the undoing of the subsequent action. The graphical representation may also be some other representation interpretable by any of the human senses (such as an audio signal).

Figure 8A:
FIG. 8A-8C illustrates various embodiments of an undo stack that may be used to implement features of the present invention.

In some embodiments, all of the editors may share the same undo stack. For instance, suppose that editor 701 performs actions A1 and A4, editor 702 performs actions A2 and A5, and editor 703 performs action A3. In that case, FIG. 8A shows a unified undo stack 801A in which action A1 is at the bottom of the stack and action A5 is at the top of the stack. Whenever any of the editors performs an action on the object graph, that action is pushed to the top of the stack. With unified stacks, whenever any of the editors requests an undo of the object graph, that action is typically popped from the top of the stack in a last in-first out manner. In order to implement the features of the present invention, however, the undo logic may track which editor performed which action. Using the principles of the present invention, a non-final action may potentially be "popped" from the middle of the stack.

Figure 8B:
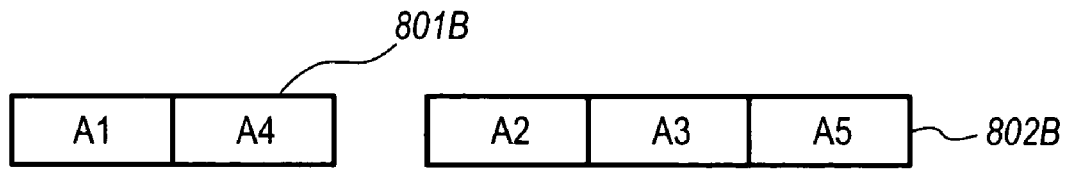

FIG. 8B illustrates an embodiment in which only two of the editors share the same stack, whereas one has its own. In particular, editor 702 (which performed action A2 and A5) and editor 703 (which performed action A3) have their own stack 802B, wherein editor 701 (which performed actions A1 and A4) has its own stack 801B. If it were desirable to implement the features of the present invention between editors 702 and 703, then the undo logic would separately track which editor performed which actions in stack 802B. Alternatively, in one embodiment, the undo logic may apply the principles of the present invention only between editors 702 and 703, but not with respect to editor 701. For instance, suppose that editor 701 initiates an undo request. If it was desirable to implement the undo dependency checking across all the editors, then the undo logic would interpret both stacks 801 B and 802B collectively to form its own conception of the unified undo stack.

Figure 8C:
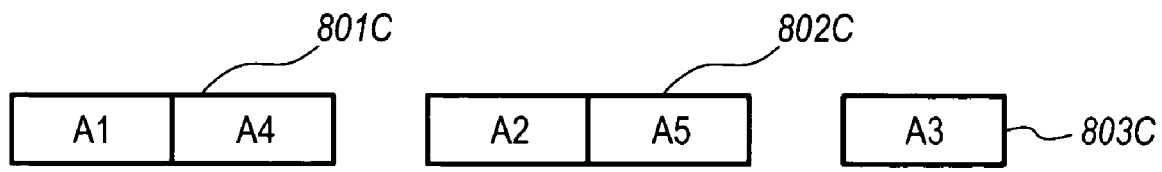

FIG. 8C illustrates an embodiment in which all three editors 701-702 have their own stacks 801C-803C, respectively. Once again, if was desirable to implement the undo dependency checking across all the editors, then the undo logic would interpret the stacks 801C-803C collectively to form its own conception of the unified undo stack.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for undoing an action on an object graph that contains a plurality of objects and object interrelationships, the method comprising:

maintaining at least two object graph partitions associated with an object graph, the at least two object graph partitions each including interdependent objects, such that two interdependent objects are in the same partition, and two objects that are not interdependent are in different partitions;

identifying one of the object graph partitions, the one of the object graph partitions being associated with a first set of objects in the object graph;

maintaining a time-based history of actions performed on objects in the object graph;

detecting an undo request for a particular action performed on particular object of the object graph despite there being one or more subsequent requests that are performed on the object graph that are not requested to be undone, wherein the particular action changes are performed on objects of a first set of one or more partitions;

when the undo request is detected:

using the time-based history of actions in identifying one or more actions on objects of the object graph which were performed at a time later than the particular action of the undo request;

identifying whether or not the one or more actions performed at a time later than the particular action of the undo request were performed on at least one object that has a partition that contains the particular object that was change as a result of performing the particular action;

performing a first execution path when the one or more actions which were performed at a time later than the particular action were performed on at least one object that has a partition that contains the particular object that was changed as a result of originally performing the particular action, the first execution path abstaining from undoing the particular action until each of the one or more actions performed at a time later than the particular action of the undo request to objects within the same partition are first undone; and performing a second execution path when the one or more actions which were performed at a time later than the particular action were not performed on any objects that have a partition that is the same as a partition that contains the particular object that was changed as a result of originally performing a particular action, the second execution path undoing the particular action without first undoing any of the one or more actions which were performed at a time later than the particular action.

2. A method in accordance with claim 1, wherein at least one of the one or more actions which were performed at a time later than the particular action was performed by a first object graph editor, and the particular action is the final action performed by a second object graph editor, wherein the undo request was initiated when using the second object graph editor.

3. A method in accordance with claim 2, wherein abstaining from undoing the particular action until each of the one or more actions performed at a time later than the particular action of the undo request to objects within the same partition are first undone comprises the following:
undoing the at least one of the one or more actions which were performed at a time later than the particular action;
graphically showing in a user interface of the second object graph editor a visual representation indicating that at least one of the one or more actions which were performed at a time later than the particular action has also been undone even though the one or more actions which were performed at a time later than the particular action were not performed using the second object graph editor; and
undoing the particular action.

4. The method in accordance with claim 2, wherein the first object graph editor has a different undo stack as compared to the second object graph editor.

5. The method in accordance with claim 2, wherein at least one of the one or more actions which were performed at a time later than the particular action was performed by a third object graph editor, wherein the second object graph editor and the third object graph editor share the same undo stack.

6. The method in accordance with claim 1, wherein the one or more actions which were performed at a time later than the particular action consists of a single action performed at a time later than the particular action.

7. The method in accordance with claim 1, wherein at least some actions performed on objects within the first partition do not alter objects within the second partition.

8. A method in accordance with claim 1, wherein identifying one of the object graph partitions comprises the following:
identifying a partition identifier within or referred to by a corresponding object; and
identifying the partition associated with the corresponding object as being the partition identified by the partition identifier.

9. A method in accordance with claim 1, wherein identifying an object graph partition comprises the following:
determining that there is no partition identifier within or referred to by a corresponding object; and
identifying the partition associated with the corresponding object as being a default partition that objects belong to when there is no express indication of a partition identifier within or referred to by a corresponding object.

10. A computer program product comprising one or more computer-readable storage media having stored thereon computer-executable instructions that, when executed by one or more processors of a computing system, cause the computing system to perform a method for undoing an action on an object graph that contains a plurality of objects and object interrelationship, the method comprising:
maintaining at least two object graph partitions associated with an object graph, the at least two object graph partitions each including interdependent objects, such that two interdependent objects are in the same partition, and two objects that are not interdependent are in different partitions;
identifying one of the object graph partitions, the one of the object graph partitions being associated with a first set of objects in the object graph;
maintaining a time-based history of actions performed on objects in the object graph;
when an undo request for a particular action performed on a particular object of the object graph is detected:
identifying whether or not the one or more actions performed at a time later than the particular action of the undo request were performed on at least one object that has a partition that is the same as a partition that contains the particular object that was changed as a result of originally performing the particular action;
performing a first execution path that is performed if when the one or more actions performed at a time later than the particular action of the undo request were performed on at least one object that has a partition that is the same as a partition that contains the particular object that was changed as a result of originally performing the particular action, the first execution path abstaining from undoing the particular action until each of the one or more actions performed at a time later than the particular action of the undo request to objects within the same partition are first undone; and
performing a second execution path when the one or more actions performed at a time later than the particular action of the undo request were not performed on any objects that have a partition that is the same as a partition that the particular object that was changed as a result of originally performing the particular action, the second execution path undoing the particular action without first undoing any of the one or more actions which were performed at a time later than the particular action.

11. A computer program product in accordance with claim 10, wherein identifying one of the object graph partitions comprises the following:
indentifying a partition identifier within or referred to by a corresponding object; and
identifying the partition associated with the corresponding object as being the partition identified by the partition identifier.

12. A computer program product in accordance with claim 11, wherein the corresponding object is a first corresponding object, wherein identifying an object graph partition associated with at least some of the objects in the object graph further comprises the following:
determining that there is no partition identifier within or referred to by a second corresponding object; and
identifying the partition associated with the corresponding object as being a default partition that objects belong to when there is no express indication of a partition identifier within or referred to by a corresponding object.

13. A computer program product in accordance with claim 10, wherein identifying one of the object graph partitions comprises the following:
determining that there is no partition identifier within or referred to by a corresponding object; and identifying the partition associated with the corresponding object as being a default partition that objects belong to when there is no express indication of a partition identifier within or referred to by a corresponding object.

14. A computer program product in accordance with claim 10, wherein the particular action involves actions performed on a plurality of objects spanning a plurality of partitions.

15. A computer program product in accordance with claim 10, wherein the method further comprises:

detecting the undo request.

16. A computer program product in accordance with claim 10, wherein at least one of the one of more actions performed at a time later than the particular action of the undo request was performed by a first object graph editor, and the particular action is the final action performed by a second object graph editor, wherein the undo request was initiated when using a user interface associated with the second object graph editor.

17. A computer program product in accordance with claim 10, wherein abstaining from undoing the particular action until each of the one or more actions performed at a time later than the particular action of the undo request to objects within the same partition are first undone comprises the following:

undoing the at least one of the one or more actions which were performed at a time later than the particular action;

graphically showing in a user interface of the second object graph editor a visual representation indicating that at least one of the one or more actions which were performed at a time later than the particular action has also been undone even though the one or more actions which were performed at a time later than the particular action were not performed using the second object graph editor; and undoing the particular action.

18. The computer program product of claim 17, wherein maintaining at least two object graph partitions associated with an object graph includes maintaining at least two object graph partitions such that all interdependent objects are in the same partition, and all objects that are not interdependent are in different partitions from that of the interdependent objects.

* * * * *